April 24, 1956     M. G. POTTER     2,743,385
VERTICAL DYNAMOELECTRIC MACHINE
Filed June 14, 1954

WITNESSES:
E. A. McCloskey.
Leon M. Garman

INVENTOR
Marion G. Potter.
BY
ATTORNEY

United States Patent Office 2,743,385
Patented Apr. 24, 1956

2,743,385

VERTICAL DYNAMOELECTRIC MACHINE

Marion G. Potter, Lima, Ohio, assignor to Westinghouse Electric Corporation, East Pittsburgh, Pa., a corporation of Pennsylvania Application June 14, 1954, Serial No. 436,275

2 Claims. (Cl. 310—157)

The present invention relates to vertical dynamoelectric machines and, more particularly, to a vertical machine having a protective canopy of improved and inexpensive construction.

The invention is particularly adapted for use in vertical electric motors of the smaller sizes, such as fractional horsepower motors, intended for outdoor service, although it will be obvious that its usefulness is not restricted to this particular application. Such motors are usually ventilated by air entering and leaving through openings in the upper and lower end brackets, and it is necessary to protect the openings in the upper bracket from the entrance of rain, or other foreign objects. This may be done by means of a canopy mounted on the upper end bracket and extending radially beyond the bracket and axially for a sufficient distance to protect the openings while allowing free circulation of air.

In the usual construction of motors of this type, the end bracket has a central hub portion extending above the surface of the bracket, and the canopy must be designed to accommodate this hub portion. This might be done by using a one-piece metal canopy having a raised central portion to accommodate the hub. The production of such a canopy, however, would require a number of drawing and annealing operations and would be very expensive, so that the use of a one-piece canopy is somewhat impractical.

The principal object of the present invention is to provide a vertical dynamoelectric machine having a protective canopy of simple and inexpensive construction.

A further object of the invention is to provide a vertical dynamoelectric machine having an inexpensive protective canopy with a central opening for the hub portion of the upper end bracket and with a resilient cap member closing and sealing the central opening.

Figure 1:
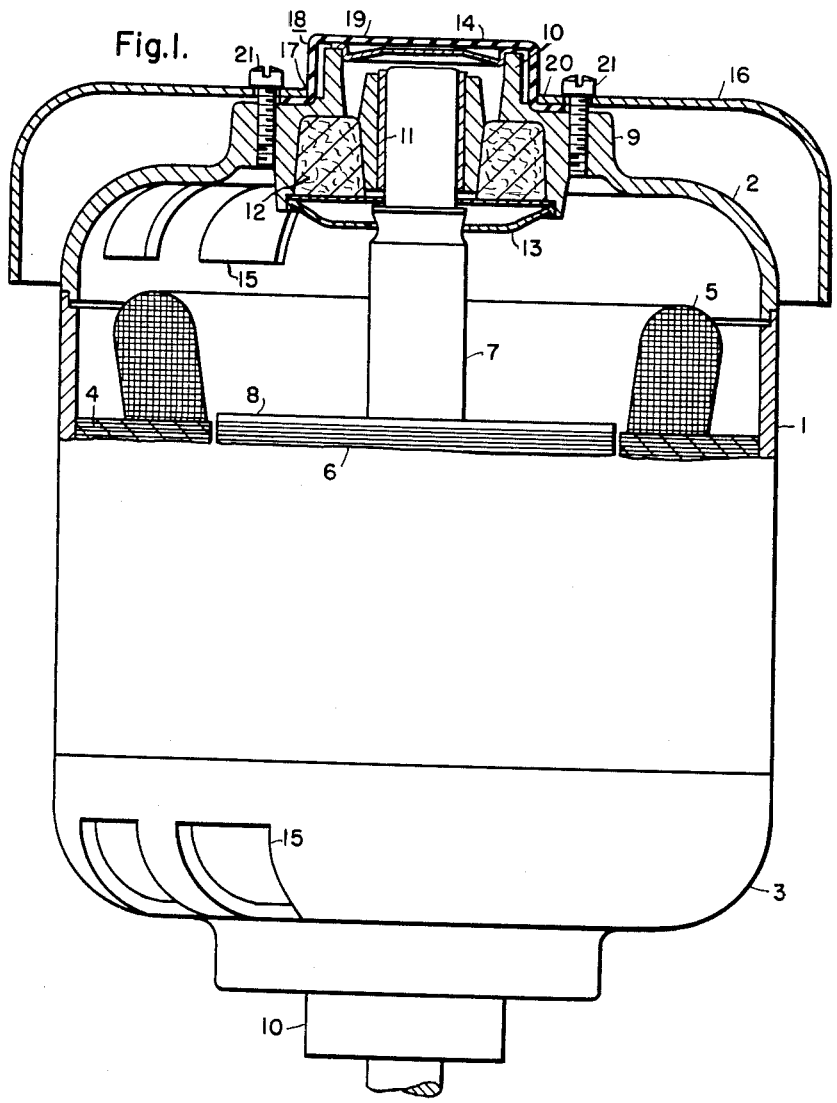
Figure 2:
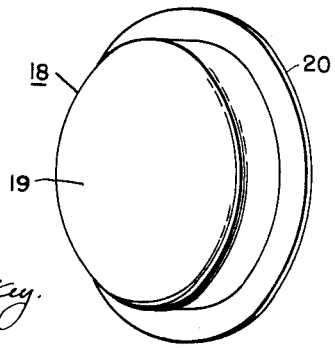

Other objects and advantages of the invention will be apparent from the following detailed description, taken in connection with the accompanying drawing, in which:

Figure 1 is a view of an electric motor, partly in elevation and partly in vertical section, showing an illustrative embodiment of the invention; and Fig. 2 is a perspective view of a cap member.

The invention is shown in the drawing embodied in a vertical electric motor having a frame member 1 which is closed at the ends by upper and lower end brackets 2 and 3, respectively. A laminated stator core 4 of any usual or desired construction is supported in the frame 1, and primary windings 5 of any suitable type are disposed in slots in the core 4. The rotor includes a laminated core 6 mounted on a shaft 7 and carrying a secondary winding, shown as a squirrel-cage winding 8.

The end brackets 2 and 3 may be of identical construction and may be secured to the frame 1 in any desired manner, as by through bolts (not shown). Each end bracket has a central portion 9 with a substantially flat surface and with an extending hub portion 10. The shaft 7 is supported for rotation in bearings 11 mounted within the hub portions 10 of the end brackets. Annular chambers may be provided in the brackets surrounding the bearings and filled with wicking 12 for retaining oil for lubrication of the bearings 11. The inner end of the hub portion may be closed by a bearing cap 13, of any suitable type, and the open upper end of the hub portion 10 of the upper bracket may be closed by a suitable dust cap 14. Each of the end brackets has ventilating openings 15 for the entrance and discharge of ventilating air.

It will be seen that when a motor of this construction is to be used outdoors, or in other locations where dripping water may be present, it is necessary to provide protective means for preventing the entrance of rain, or other dripping water or foreign material, into the ventilating openings 15 of the upper bracket 2. For this purpose a metal canopy 16 is mounted on the upper bracket 2 and, as shown, the canopy extends radially beyond the bracket 2 and axially past the openings 15. Thus the openings are protected against rain or falling objects but circulation of ventilating air through the openings 15 is not obstructed.

Since the canopy 16 must be attached to the flat surface of the bracket 2, it must be designed to accommodate the upwardly extending hub portion 10. As previously indicated, this might be done by providing a one-piece metal bracket having a raised central portion to accommodate the hub, but the several drawing and annealing operations that would be required to produce such a bracket would make its cost too high for practical use. Another possibility would be to form the canopy with a central opening for the hub portion 10 and to solder, or otherwise secure, a separate metal cap member in this opening to extend over the hub 10. Such a canopy, however, would also be rather expensive because of the number of manufacturing operations required to press the cap into place, solder it to the canopy, and clean off the soldering flux to permit painting.

In accordance with the present invention, these expensive manufacturing operations are eliminated by using a simple metal canopy with a separate central cap member. The canopy 16 has a central opening 17 surrounding the hub portion 10 of the bracket 2, and this opening is closed and sealed by a central cap member 18. As clearly shown in Fig. 2, the cap 18 has a raised central portion 19, which extends over the hub portion 10, and a peripheral flange 20. Since the only purpose of the cap is to keep rain water, or other foreign material, from entering the hub portion 10 and getting into the bearing or the motor, and to prevent water from seeping under the canopy through the opening 17, it is not necessary for the cap member to be an integral part of the canopy 16. The cap 18 is therefore a separate member and is made of a resilient, weather-resistant material which can be easily and inexpensively molded to the desired shape. The preferred material for the cap 18 is polyethylene, but other resilient materials having suitable characteristics might be used if desired.

In the assembly of the canopy, the cap 18 is placed in the central opening 17 with the flange 20 extending under the edge of the canopy 16. The canopy and cap are then placed in position on the motor, and the canopy is secured to the end bracket 2 by means of screws 21 passing through openings in the canopy into threaded holes in the end bracket. When the screws 21 are tightened down, the flange 20 of the cap 18 is compressed between the canopy and the end bracket and thus effectively seals the opening in the canopy, so that moisture is prevented from seeping in under the canopy and getting into the motor. In this way, the motor is effectively protected but the cost is kept low since both the canopy 16 and the resilient cap 18 are simple, easily manufactured members.

It should now be apparent that a protective canopy has been provided for vertical dynamoelectric machines which can readily be produced at low cost, and which effectively protects the motor against the entrance of rain or other foreign objects. The resilient cap member is easily and inexpensively produced and effectively covers the hub of the upper end bracket and seals the opening in the canopy, so that complete protection is provided. A particular embodiment of the invention has been shown and described for the purpose of illustration, but it will be obvious that various modifications and other embodiments are possible within the scope of the invention and it is not restricted to the specific details of construction shown.

I claim as my invention:

1. A vertical dynamoelectric machine having a frame member, upper and lower end brackets on the frame member, the upper end bracket having an extending hub portion, a canopy member extending over the upper end bracket, said canopy member having a central opening through which the hub portion extends, means for securing the canopy member to the upper end bracket, and a resilient cap member covering the hub portion and closing and sealing said opening.

2. A vertical dynamoelectric machine having a frame member, upper and lower end brackets on the frame member, the upper end bracket having an extending hub portion, a canopy member extending over the upper end bracket, said canopy member having a central opening through which the hub portion extends, a cap member of resilient material disposed in said opening, the cap member having a central portion extending over the hub portion and a peripheral flange extending under the canopy member, and means for securing the canopy member to the upper end bracket with said flange clamped against the bracket to seal the opening.

References Cited in the file of this patent

UNITED STATES PATENTS

| | | |
|---|---|---|
| 2,107,819 | Faber | Feb. 8, 1938 |
| 2,295,965 | Pierce | Sept. 15, 1942 |